(12) United States Patent
Ojima et al.

(10) Patent No.: US 12,497,098 B2
(45) Date of Patent: Dec. 16, 2025

(54) STEERING SYSTEM FOR VEHICLE (71) Applicants: HONDA MOTOR CO., LTD., Tokyo (JP); THYSSENKRUPP PRESTA AKTIENGESELLSCHAFT, Eschen (LI)

(72) Inventors: Yosuke Ojima, Tokyo (JP); Munetsugu Hanji, Tokyo (JP); Bence Bodnar, Kiskunfelegyhaza (HU)

(73) Assignees: HONDA MOTOR CO., LTD., Tokyo (JP); THYSSENKRUPP PRESTA AKTIENGESELLSCHAFT, Eschen (LI)

( * ) Notice: Subject to any disclaimer, the term of this patent is extended or adjusted under 35 U.S.C. 154(b) by 476 days.

(21) Appl. No.: 18/002,529

(22) PCT Filed: Mar. 4, 2021

(86) PCT No.: PCT/JP2021/008410
§ 371 (c)(1),
(2) Date: Dec. 20, 2022

(87) PCT Pub. No.: WO2022/185478
PCT Pub. Date: Sep. 9, 2022

(65) Prior Publication Data
US 2023/0227101 A1    Jul. 20, 2023

(51) Int. Cl.
*B62D 6/00* (2006.01)
*B62D 6/02* (2006.01)
(52) U.S. Cl.
CPC ............. *B62D 6/002* (2013.01); *B62D 6/008* (2013.01); *B62D 6/02* (2013.01)

(58) Field of Classification Search
CPC ........... B62D 6/002; B62D 6/008; B62D 6/02
See application file for complete search history.

(56) References Cited

U.S. PATENT DOCUMENTS

| 5,796,248 A | * | 8/1998 | Weber | ..................... F02D 11/10 |
| | | | | 324/207.16 |
| 5,896,942 A | * | 4/1999 | Bohner | .................. B62D 5/005 |
| | | | | 180/444 |

(Continued)

FOREIGN PATENT DOCUMENTS

| DE | 10302559 A1 | 9/2004 |
| DE | 102020104463 A1 | 9/2020 |
| JP | 2007153109 A | 6/2007 |

OTHER PUBLICATIONS

PCT International Search Report for Patent Application PCT/JP2021/008410 mailed Nov. 24, 2021; 4 pp.

*Primary Examiner* — Timothy Wilhelm
(74) *Attorney, Agent, or Firm* — Armstrong Teasdale LLP (57) ABSTRACT

Provided is a steer-by-wire steering system for a vehicle that can prevent the vehicle from suddenly accelerating in a direction which the drive did not anticipate even when the steering angle of the steering member was changed while the vehicle was parked. When the steered angle deviates from the prescribed relationship to the steering angle (ST2: Yes), immediately or upon satisfaction of a trigger condition, the control unit drives the steering actuator to bring the steered angle to come closer to the prescribed relationship to the steering angle (ST16, ST17, ST20, ST21), and sets an upper limit to a speed or an acceleration of the vehicle (ST7).

5 Claims, 10 Drawing Sheets

(56) References Cited

U.S. PATENT DOCUMENTS

| | | | | |
|---|---|---|---|---|
| 5,931,256 | A * | 8/1999 | Langkamp | B62D 6/008 180/405 |
| 6,336,519 | B1 * | 1/2002 | Bohner | B62D 5/30 180/406 |
| 6,637,543 | B2 * | 10/2003 | Card | B62D 7/159 701/41 |
| 6,795,763 | B2 * | 9/2004 | Yao | B62D 6/008 701/44 |
| 6,847,177 | B1 * | 1/2005 | Gluch | H02K 29/06 318/567 |
| 7,034,483 | B2 * | 4/2006 | Takahashi | B62D 6/008 318/434 |
| 7,130,728 | B2 * | 10/2006 | Suzuki | B62D 6/008 180/413 |
| 7,595,577 | B2 * | 9/2009 | Niguchi | H02K 29/03 310/156.01 |
| 7,694,777 | B2 * | 4/2010 | Yamashita | B62D 5/0484 180/443 |
| 8,672,084 | B2 * | 3/2014 | Watanabe | B62D 7/1581 180/408 |
| 9,366,523 | B2 * | 6/2016 | Klimenko | F24S 20/69 |
| 9,623,900 | B2 * | 4/2017 | Yukitake | B62D 5/003 |
| 10,940,882 | B2 * | 3/2021 | Kim | B62D 5/006 |
| 10,953,912 | B2 * | 3/2021 | Rawlings | F16H 57/039 |
| 11,075,599 | B2 * | 7/2021 | Shiino | B62D 5/0463 |
| 11,167,793 | B2 * | 11/2021 | Hong | B62D 5/0469 |
| 11,780,493 | B2 * | 10/2023 | Shimizu | B60W 10/04 701/41 |
| 11,897,553 | B2 * | 2/2024 | Shin | B62D 5/0463 |
| 12,030,559 | B2 * | 7/2024 | Kakimoto | B62D 15/021 |
| 12,116,051 | B2 * | 10/2024 | Kakas | B62D 5/003 |
| 12,258,080 | B2 * | 3/2025 | Ojima | B62D 15/021 |
| 2001/0056317 | A1 * | 12/2001 | Nishizaki | B62D 6/003 701/41 |
| 2004/0088093 | A1 * | 5/2004 | Yao | B62D 6/008 180/443 |
| 2006/0129294 | A1 | 6/2006 | Moser et al. | |
| 2006/0169519 | A1 * | 8/2006 | Osonoi | B62D 1/163 180/402 |
| 2007/0107974 | A1 * | 5/2007 | Ueno | H02K 21/14 180/444 |
| 2007/0168093 | A1 * | 7/2007 | Nishiyama | B62D 5/0466 701/41 |
| 2010/0168964 | A1 * | 7/2010 | Higashi | B62D 5/008 701/42 |
| 2013/0138300 | A1 * | 5/2013 | Hayama | B62D 5/046 701/43 |
| 2014/0343697 | A1 * | 11/2014 | Kuipers | B60W 50/16 700/83 |
| 2021/0016830 | A1 * | 1/2021 | Riese | B62D 6/008 |
| 2021/0070361 | A1 * | 3/2021 | Erickson | B62D 15/0235 |
| 2022/0185364 | A1 * | 6/2022 | Kwon | B62D 5/0406 |
| 2022/0410966 | A1 * | 12/2022 | Fujita | B62D 15/022 |
| 2023/0014650 | A1 * | 1/2023 | Kim | B62D 5/006 |

* cited by examiner

STEERING SYSTEM FOR VEHICLE

CROSS-REFERENCE TO RELATED APPLICATION

This application is a U.S. National Phase Application of PCT/JP2021/008410, filed on Mar. 4, 2021. The content of this application is hereby expressly incorporated by reference in its entirety.

TECHNICAL FIELD

The present invention relates to a steer-by-wire steering system for a vehicle.

BACKGROUND ART

Known is a steer-by-wire steering system for a vehicle which includes a steering member such as a steering wheel configured to be operated by a driver, and a steering mechanism mechanically separated from the steering member and configured to change the steered angle of the wheels. The steering mechanism is driven by a steering actuator that generates a driving force to change the steering angle of the wheels. A reaction force actuator applies a reaction force to the steering member in response to the steering operation. In such a steering system, in the event that the steering angle of the steering member should deviate from a prescribed relationship with the steered angle of the wheels because the steering member is moved after the ignition switch of the vehicle is turned off, and the ignition switch is turned on thereafter, the wheels will be steered by the steering actuator until the steered angle of the wheels coincides with the steering angle of the steering member. See Patent Document 1, for instance. According to Patent Document 1, the timing of steering the wheels is preferably selected to be before the vehicle starts traveling, and more preferably before the engine is started.

CITATION LIST

[Patent Literature 1] JP2007-153109A

SUMMARY OF INVENTION

Technical Problem

However, the maximum output of the steering actuator may be reduced due to a failure in the steering actuator or an overheating of the electric motor of the steering actuator. In such a case, according to the invention disclosed in Patent Document 1, the vehicle may start traveling before the wheels are steered to a steered angle corresponding to the steering angle of the steering member. Further, if the driver abruptly depresses the accelerator pedal, the vehicle may suddenly accelerate in a direction which the drive did not anticipate.

In view of such a problem of the prior art, a primary object of the present invention is to provide a steer-by-wire steering system for a vehicle that can prevent the vehicle from suddenly accelerate in a direction which the drive did not anticipate even when the steering angle of the steering member was changed while the vehicle was parked.

Solution of Problem

To achieve such an object, the present invention provides a steering system (1) for a vehicle (2), comprising: a steering member (10) configured to receive a steering operation; a steering mechanism (11) mechanically separated from the steering member and configured to steer wheels (3) via a movement thereof; a steering angle sensor (21) that detects a steering angle ($\beta$) of the steering member; a steered angle sensor (32) that detects a steered angle ($\alpha$) of the wheels; a steering actuator (12) configured to provide a drive force to the steering mechanism; a reaction force actuator (13) configured to apply a reaction force to the steering member in response to the steering operation; and a control unit (15) that controls an operation of the steering actuator to cause the steered angle to be in a prescribed relationship to the steering angle, and an operation of the reaction actuator to cause the reaction force to correspond to a steered state of the wheels, wherein when the steered angle deviates from the prescribed relationship to the steering angle (ST2: Yes), immediately or upon satisfaction of a trigger condition, the control unit drives the steering actuator to bring the steered angle to come closer to the prescribed relationship to the steering angle (ST16, ST17, ST20, ST21), and sets an upper limit to a speed or an acceleration of the vehicle (ST7).

Thus, an upper limit is set on the speed or the acceleration of the vehicle when the steered angle deviates from the prescribed relationship to the steering angle. By thus limiting the speed or the acceleration of the vehicle, the vehicle is prevented from suddenly accelerating in a direction which the drive did not anticipate.

Preferably, the control unit is configured to acquire a maximum output of the steering actuator (ST3), and when the maximum output of the steering actuator is equal to or greater than a prescribed value (ST4: Yes), does not set the upper limit to the speed or the acceleration of the vehicle.

If an upper limit is set to the speed or the acceleration of the vehicle whenever the steered angle deviates from the prescribed relationship to the steering angle, the vehicle is prevented from accelerating as intended by the driver even when the wheels can be properly driven to the steered angle corresponding to the steering angle of the steering member. According to this arrangement, since no upper limit is set to the speed or the acceleration of the vehicle when the maximum output of the steering actuator is equal to or greater than the prescribed value, an unnecessary limit on the acceleration of the vehicle intended by the driver can be avoided.

Preferably, the control unit computes (ST5) a maximum correction angle ($\alpha_{cmax}$) which is given as a maximum change value of the steered angle that can be effected within a prescribed time period according to the maximum output of the steering actuator, and does not set the upper limit to the speed or the acceleration of the vehicle, even when the maximum output of the steering actuator is smaller than the prescribed value (ST4: No), as long as the steered angle deviates from the prescribed relationship to the steering angle by a deviation amount ($\alpha_{dev}$) equal to or smaller than the maximum correction angle (ST6: Yes).

Since no upper limit is set to the speed or the acceleration of the vehicle when the deviation amount of the steered angle from the prescribed relationship is equal to or less than the maximum correction angle, any undesired limit on the acceleration of the vehicle can be avoided in a reliable manner.

Preferably, when the maximum output of the steering actuator is smaller than the prescribed value (ST4: No), and the deviation amount by which the steered angle deviates from the prescribed relationship is equal to or greater than the maximum correction angle (ST6: No), the control unit sets the upper limit to the speed or the acceleration of the vehicle until the maximum output becomes equal to or greater than the prescribed value, or until the deviation amount becomes equal to or smaller than the maximum correction angle (ST6: Yes).

Thereby, a sudden acceleration of the vehicle can be avoided until it becomes possible to make the traveling direction of the vehicle and the direction anticipated by the driver agree with each other within a prescribed time period, and the vehicle can be accelerated as desired by the driver once it has become possible to make the traveling direction of the vehicle and the direction anticipated by the driver agree with each other within the prescribed time period. Thereby, both steering operation and acceleration of the vehicle can be performed as the driver desires.

Preferably, the control unit computes (ST5) a maximum correction angle ($\alpha_{max}$) which is given as a maximum change value of the steered angle that can be effected within a prescribed time period according to the maximum output of the steering actuator, and does not set the upper limit to the speed or the acceleration of the vehicle, even when the maximum output of the steering actuator is smaller than the prescribed value (ST4: No), if a same direction correction amount ($\alpha_{devn}$) given as the correction amount that is required to make the steered angle to be on a same side of a neutral point as the steering angle is equal to or smaller than the maximum correction angle (ST6: Yes).

Since no upper limit is set to the speed or the acceleration of the vehicle if the same direction correction amount given as the correction amount that is required to make the steered angle to be on a same side of a neutral point as the steering angle is equal to or smaller than the maximum correction angle, the acceleration of the vehicle intended by the driver is prevented from being unnecessarily restricted.

Preferably, when the maximum output of the steering actuator is less than the prescribed value (ST4: No), and the same direction correction amount is greater than the maximum correction angle (ST36: No), the control unit sets the upper limit to the speed or the acceleration of the vehicle until the steered angle comes to be on a same side of the neutral point as the steering angle (ST31: No), until the maximum output becomes equal to or greater than the prescribed value (ST4: Yes), or until the same direction correction mount becomes equal to or greater smaller than the maximum correction angle (ST36: Yes).

Thereby, a sudden acceleration of the vehicle can be avoided until it becomes possible to make the traveling direction of the vehicle and the direction anticipated by the driver agree with each other within a prescribed time period, and the vehicle can be accelerated as desired by the driver once it has become possible to make the traveling direction of the vehicle and the direction anticipated by the driver agree with each other within the prescribed time period. Thereby, both steering operation and acceleration of the vehicle can be performed as the driver desires.

Advantageous Effects of Invention

The present invention thus provides a steering system for a vehicle that can prevent the vehicle from suddenly accelerating in a direction not anticipated by the driver when the steering angle of the steering member is changed during parking.

DESCRIPTION OF EMBODIMENTS

Figure 1:
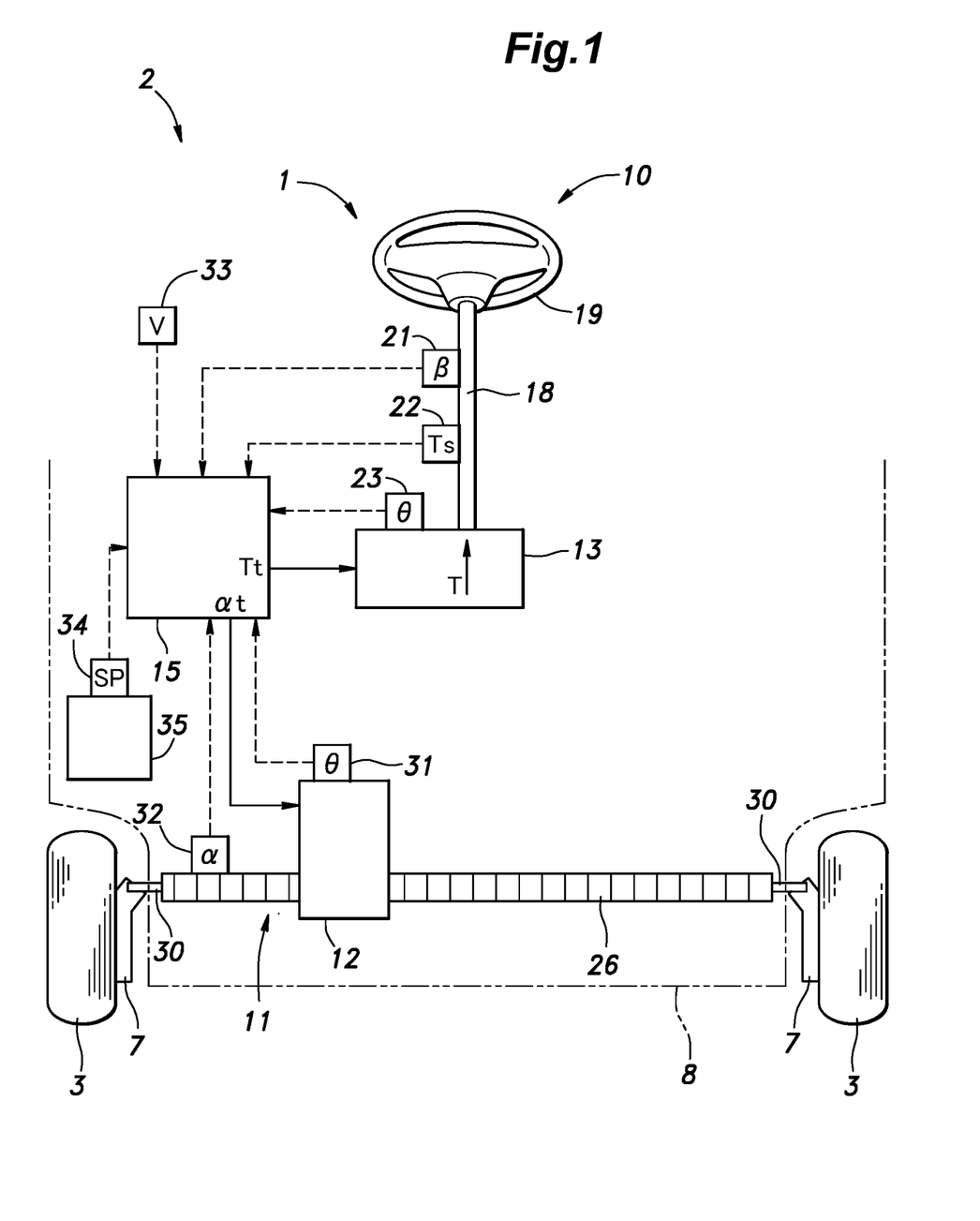
FIG. 1 is a schematic diagram of a steering system according to an embodiment of the present invention.

A steering system 1 for a vehicle 2 according an embodiment of the present invention is described in the following. As shown in FIG. 1, the steering system 1 consists of a steer-by-wire (SBW) steering system. The vehicle 2 fitted with the steering system 1 is a four-wheeled vehicle having left and right front wheels 3 and left and right rear wheels (not shown in the drawings). The left and right front wheels 3 are supported by a vehicle body 8 (only the outline of a lower part thereof is shown in FIG. 1) via respective knuckles 7 so that the steered angle $\alpha$ of the front wheels 3 can be changed, and the front wheels 3 thus serve as steerable wheels. The steered angle $\alpha$ refers to the angle of the front wheels 3 with respect to the fore and aft direction in plan view. The steering system 1 thus changes the steered angle $\alpha$ of the front wheels 3.

The steering system 1 includes a steering member 10 rotatably provided on the vehicle body 8, a steering mechanism 11 for steering the front wheels 3, a steering actuator 12 for applying a driving force to the steering mechanism 11, a reaction force actuator 13 that applies a reaction torque T to the steering member 10, and a control unit 15 that controls the reaction force actuator 13 and the steering actuator 12. The steering system 1 may be a redundant system that includes a plurality of sets each of which is provided with a steering actuator 12, a reaction force actuator 13, and a control unit 15.

The steering member 10 accepts a steering operation by the driver. The steering member 10 includes a steering shaft 18 rotatably supported by the vehicle body 8 and a steering wheel 19 provided at an end of the steering shaft 18. The steering shaft 18 is rotatably supported by a steering column 20 provided on the vehicle body 8, and has a rear end thereof projecting rearward from the steering column 20. The steering wheel 19 is connected to the rear end of the steering shaft 18 so as to rotate integrally with the steering shaft 18.

The reaction force actuator 13 consists of an electric motor which is connected to the steering shaft 18 via a gear mechanism. When the reaction force actuator 13 is driven, the driving force is transmitted to the steering shaft 18 as a rotational force. The reaction force actuator 13 applies a rotational torque to the steering member 10. The torque applied to the steering member 10 by the reaction force actuator 13 in response to the steering operation is called a reaction torque T.

The steering system 1 is further provided with a steering angle sensor 21 that detects the rotational angle of the steering shaft 18 around the central axis thereof as a steering angle $\beta$. The steering angle sensor 21 may be a per se known rotary encoder. Further, the steering system 1 is provided with a torque sensor 22 that detects the torque applied to the steering shaft 18 as a steering torque Ts. The torque sensor 22 detects the steering torque Ts applied to a part of the steering shaft 18 located between the steering wheel 19 and the reaction force actuator 13. The steering torque Ts is determined by the operating torque applied to the steering wheel 19 by the driver and the reaction torque T applied to the steering shaft 18 by the reaction force actuator 13. The torque sensor 22 may consist of a per se known torque sensor such as a magnetostrictive torque sensor or a strain gauge, or, alternatively, the steering torque may be estimated from the value of the electric current flowing through the electric motor of the reaction force actuator 13.

The steering system 1 further includes a first rotational angle sensor 23 that detects the rotational angle $\theta$ of the reaction force actuator 13. The first rotational angle sensor 23 may be a per se known resolver or rotary encoder.

The steering mechanism 11 has a rack 26 extending in the vehicle lateral direction. The rack 26 is supported by a gear housing 27 so as to be movable in the vehicle lateral direction. The left and right ends of the rack 26 are respectively connected to knuckles 7 that support the left and right front wheels 3 via respective tie rods 30. As the rack 26 moves in the vehicle lateral direction, the steered angle $\alpha$ of the front wheels 3 changes. The steering mechanism 11 is mechanically separated from the steering member 10.

The steering actuator 12 consists of an electric motor. The steering actuator 12 moves the rack 26 in the vehicle lateral direction according to the signal from the control unit 15, and changes the steered angle $\alpha$ of the left and right front wheels 3 accordingly.

The steering system 1 is further provided with a second rotational angle sensor 31 that detects the rotational angle $\theta$ of the steering actuator 12. The second rotational angle sensor 31 may be a per se known resolver or rotary encoder. Further, the steering system 1 has a steered angle sensor 32 that detects the steered angle $\alpha$ of the front wheels 3. In the present embodiment, the steered angle sensor 32 consists of a rack stroke sensor that detects the rack position (the position of the rack 26 along the lateral direction of the vehicle), and the steered angle $\alpha$ of the front wheels 3 is determined from the rack position.

The control unit 15 consists of an electronic control unit including a CPU, memory, a storage device for storing a program, and the like. The steering angle sensor 21, the torque sensor 22, the first rotational angle sensor 23, the second rotational angle sensor 31, and the steered angle sensor 32 are connected to the control unit 15. Based on the signals from these sensors, the control unit 15 acquires signals corresponding to the steering angle $\beta$, the steering torque Ts, the rotational angle $\theta$ of the reaction force actuator 13, the rotational angle $\theta$ of the steering actuator 12, and the steered angle $\alpha$. Further, the control unit 15 is connected to a vehicle speed sensor 33, and a shift position sensor 34, and acquires signals corresponding to the vehicle speed V and the transmission shift position SP of a transmission device 35.

The transmission device 35 is a device that changes the mode of power transmission from the drive source mounted on the vehicle 2 to the wheels. For example, when the vehicle 2 is equipped with an internal combustion engine as a propelling drive source, the transmission device 35 is a device that changes the mode of driving force transmission from the internal combustion engine to the driven wheels. Further, when the vehicle 2 is equipped with an electric motor as a propelling drive source, the transmission device 35 is a power unit that changes the mode of driving force transmission from the electric motor to the driven wheels.

In the case of an automatic transmission device, the transmission device 35 includes a park position "P", a neutral position "N", a drive position "D", and a reverse position "R" as transmission shift positions SP representing different driving force transmission modes. The drive position "D" may have one range, or may have a plurality of ranges including the first speed (L), the second speed (2), and the like. When the transmission device 35 is a manual transmission device, the transmission device 35 has a neutral position "N", a drive position "D", and a reverse position "R". The drive position "D" may have a plurality of ranges such as 1st speed to 5th speed. Hereinafter, the drive position "D" and the reverse position "R" are collectively referred to as the travel position.

The transmission shift position SP of the transmission device 35 is switched by the driver's switching operation performed to a switching member such as a shift lever or a shift button. The shift button may be a function button displayed on a touch panel display. The shift position sensor 34 acquires a signal corresponding to the transmission shift position SP of the transmission device 35 switched by the driver. The vehicle system provided with the control unit 15 is configured to be turned on and off only when the transmission device 35 is in the park position "P" or the neutral position "N".

The control unit 15 is connected to the reaction force actuator 13 and the steering actuator 12, and controls the reaction force actuator 13 and the steering actuator 12. The control unit 15 controls the steering actuator 12 according to the steering angle $\beta$, and controls the reaction force actuator 13 according to the steered angle $\alpha$.

Figure 2:
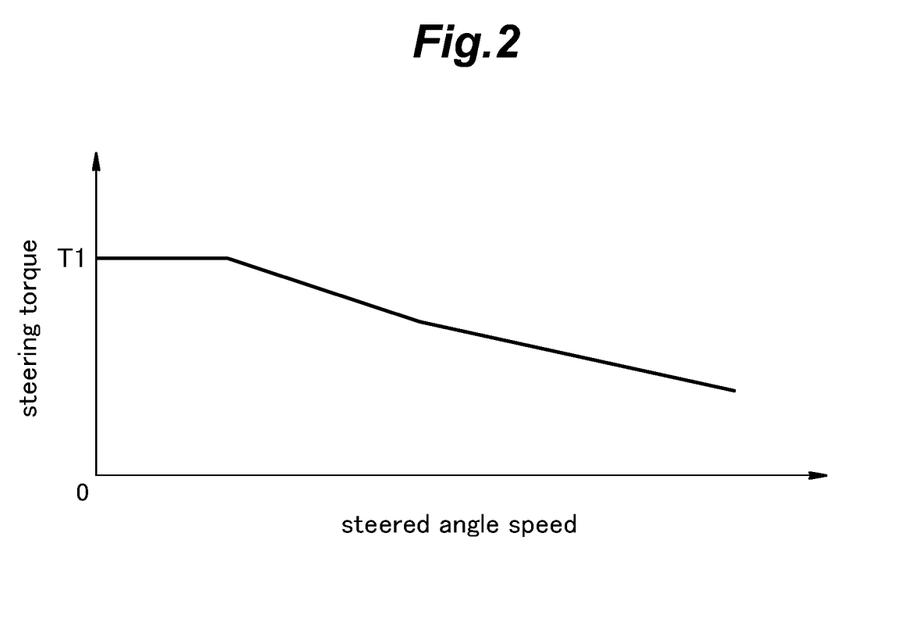
FIG. 2 is a graph showing an output property of a steering actuator.

Further, the control unit 15 is configured to manage the output characteristics of the steering actuator 12. FIG. 2 is a graph showing the output characteristics of the steering actuator 12. As shown in FIG. 2, the output characteristics of the steering actuator 12 are such that the steering actuator 12 is able to steer the front wheels 3 at a prescribed speed (steering angular velocity) with a steering torque T1 which is required to steered the front wheels 3 when the vehicle 2 is stationary. Therefore, the control unit 15 is enabled to steer the front wheels 3 at a prescribed speed when the vehicle 2 is stationary by driving the steering actuator 12 at the maximum output thereof as shown in FIG. 2. The steering actuator 12 exhibits a higher (faster) steering angular velocity as the steering torque required to steer the front wheels 3 becomes smaller.

On the other hand, the steering actuator 12 may not be operated at the maximum output in such cases as when a failure occurred to the power supply system, and when the steering actuator 12 is in a degraded state. The degraded state means a state in which the output of the steering actuator 12 is limited due to a cause such as the overheating of the steering actuator 12. In such a case, the control unit 15 acquires a maximum output that can be produced from the steering actuator 12 as a value smaller than the rated output of the steering actuator 12. This maximum output is thus smaller than the characteristic value (rated output torque) of the steering actuator 12 shown in FIG. 2, and varies (for example, 90%, 50%, etc.) depending to the operating condition, the temperature, and the like of the steering actuator 12. The maximum output may be obtained by using an output value of a sensor or by estimation.

The control action of the control unit 15 in the SBW mode is specifically described in the following. The control unit 15 computes a target steered angle $\alpha t$ having a prescribed relationship with the steering angle $\beta$ according to the actual steering angle $\beta$ detected by the steering angle sensor 21. The control unit 15 may compute the target steered angle $\alpha t$ by, for example, multiplying the steering angle $\beta$ by a predetermined gear ratio K ($\alpha t=\beta \times K$). The gear ratio K may be, for example, 0.01 to 0.5, and is preferably 0.125. Then, the control unit 15 computes a first current value A1 to be supplied the steering actuator 12 according to the deviation $\Delta \alpha$ (=$\alpha t-\alpha$) between the target steered angle $\alpha t$ and the actual steered angle $\alpha$ so that the steered angle $\alpha$ coincides with the target steered angle $\alpha t$. In other words, the control unit 15 performs a feedback control of the steering actuator 12 according to the deviation $\Delta \alpha$. With an increase in the deviation $\Delta \alpha$, the first current value A1 supplied to the steering actuator 12 becomes greater, and the output of the steering actuator 12 is increased with the result that the speed of change (change rate) in the steered angle $\alpha$ increases.

The control unit 15 computes the target reaction torque Tt to be generated by the reaction force actuator 13 according to the steering state of the front wheels 3, in particular according to the deviation $\Delta \alpha$. The target reaction torque Tt may be computed by multiplying $\Delta \alpha$ by a predetermined coefficient. Then, the control unit 15 computes a second current value A2 to be supplied to the reaction force actuator 13 according to the computed target reaction torque Tt. The second current value A2 to be supplied to the reaction force actuator 13 may be determined by referring to a predetermined map according to the target reaction torque Tt. Alternatively, the control unit 15 may determine the second current value A2 by referring to a predetermined map according to the deviation $\Delta \alpha$. The target reaction torque Tt and the second current value A2 become greater in value as the deviation $\Delta \alpha$ of the steered angle $\alpha$ increases.

The control unit 15 supplies the second current value A2 to the reaction force actuator 13 and generates a driving force in the reaction force actuator 13. The driving force generated by the reaction force actuator 13 is applied to the steering shaft 18 as a reaction torque T that opposes the operation input of the driver. As a result, the driver can receive a reaction force (resistance force) against the steering operation from the steering wheel 19.

The control unit 15 is activated when the ignition switch of the vehicle 2 is turned on, and is deactivated when the ignition switch is turned off. Therefore, with the ignition switch turned off, even if the steering member 10 is turned and the steering angle $\beta$ changes, the steered angle $\alpha$ of the front wheels 3 does not change, and no reaction torque T is produced. Therefore, while the ignition switch is turned off, the steering angle $\beta$ of the steering member 10 and the steered angle $\alpha$ of the front wheels 3 may deviate from the above-mentioned prescribed gear ratio relationship. In the following disclosure, the two angles which are normalized by taking into account the gear ratio are referred to as phases, and the angular deviation from the prescribed relationship between the steered angle $\alpha$ and the steering angle $\beta$ is referred to as the phase difference. The phase difference can be created in a plurality of different types.

Figure 3:
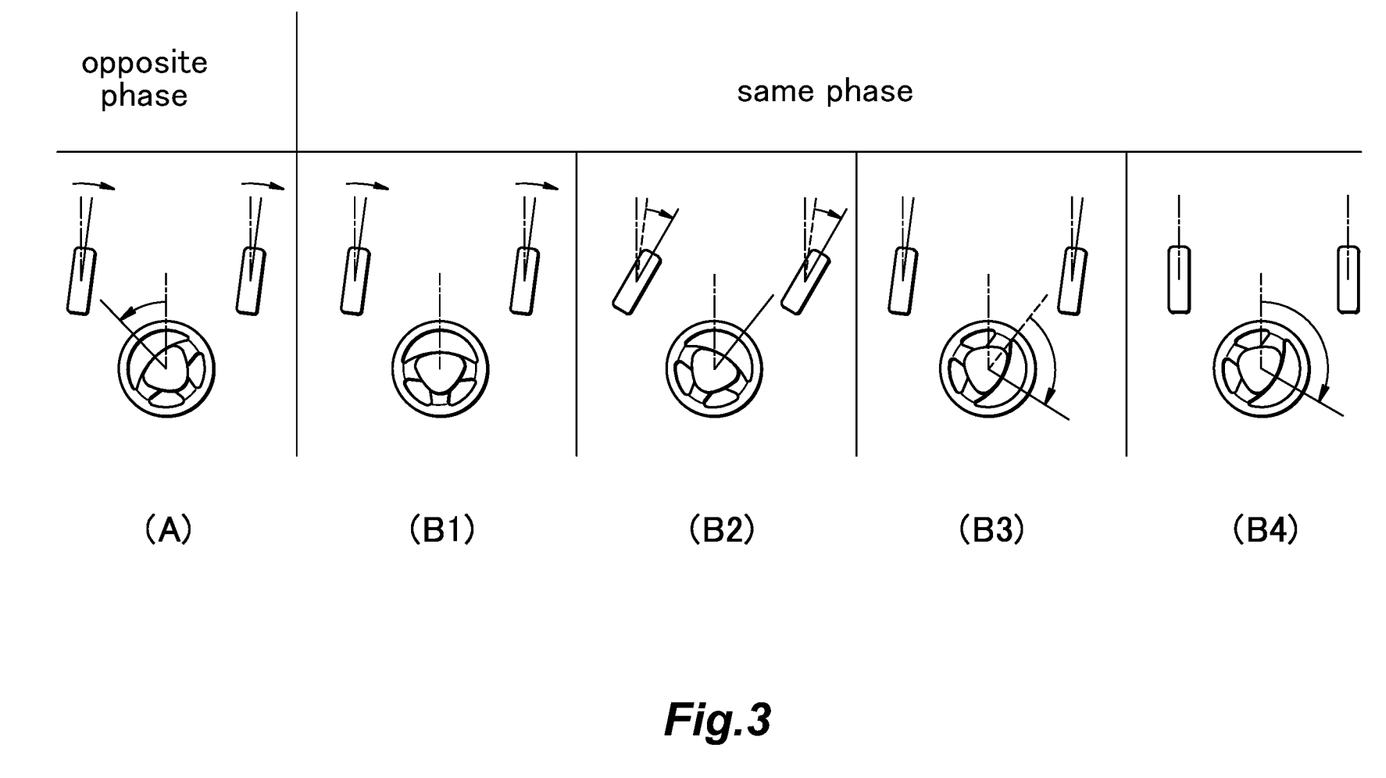
FIG. 3 is a schematic diagram illustrating the relationship between the steering angle of a steering member and the steered angle of the front wheels.

FIG. 3 is a diagram showing a phase relationship between the steering angle $\beta$ of the steering member 10 and the steered angle $\alpha$ of the front wheels 3. As shown in FIG. 2, the phases of the steering angle $\beta$ and the steered angle $\alpha$ may deviate from each other in two different types; type A or an opposite phase relationship where the phases of the steering angle $\beta$ and the steered angle $\alpha$ are opposite to each other, and type B or a same phase relationship where the phases of the steering angle $\beta$ and the steered angle $\alpha$ agree with each other. When only one of the phases of the steering angle $\beta$ and the steered angle $\alpha$ is 0, or within a prescribe small angular range around zero, the two phases are regarded as the same. Thus, type B can be further classified into four types; type B1 where the steering angle $\beta$ is 0 and the steered angle $\alpha$ is not 0, type B2 where the phase of the steered angle $\alpha$ is greater than the phase of the steering angle $\beta$, type B3 where the phase of the steered angle $\alpha$ is smaller than the phase of the steering angle $\beta$, and type B4 where the steering angle $\beta$ is greater than 0 in either direction and the steered angle $\alpha$ is 0.

Figure 4:
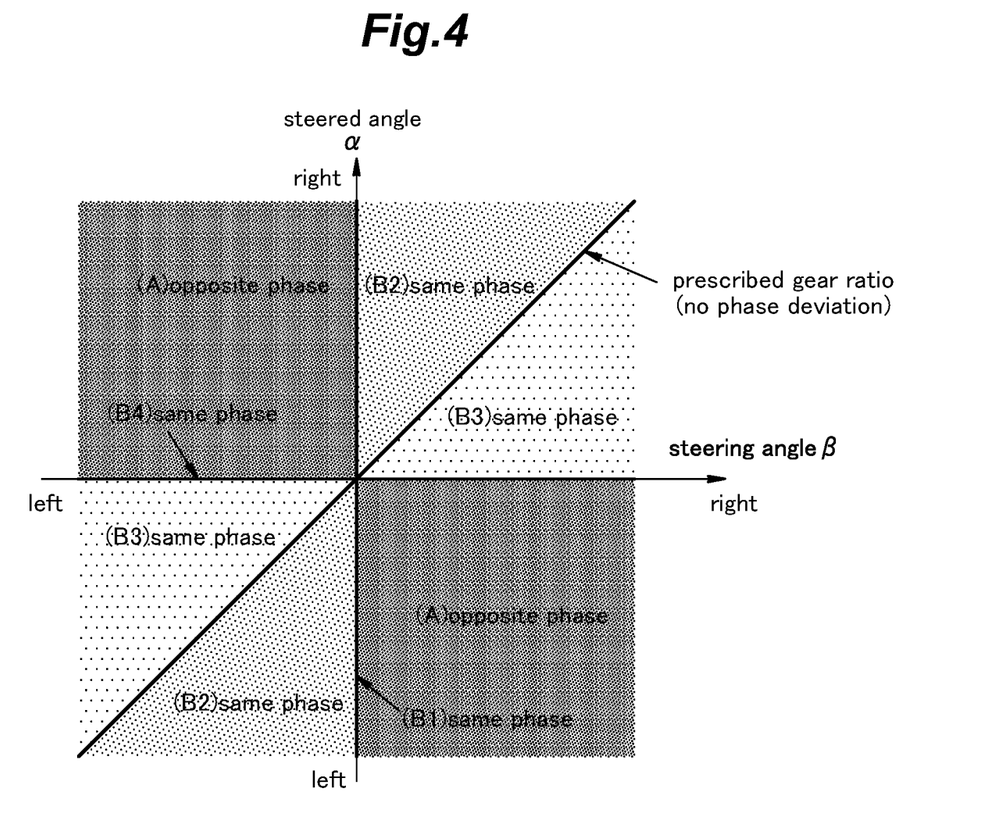
FIG. 4 is a diagram showing the relationship between the steering angle of a steering member and the steered angle of the front wheels.

FIG. 4 is a diagram showing the relationship between the steering angle $\beta$ of the steering member 10 and the steered angle $\alpha$ of the front wheels 3 which includes the single opposite phase type, and the four same phase types.

Figure 5:
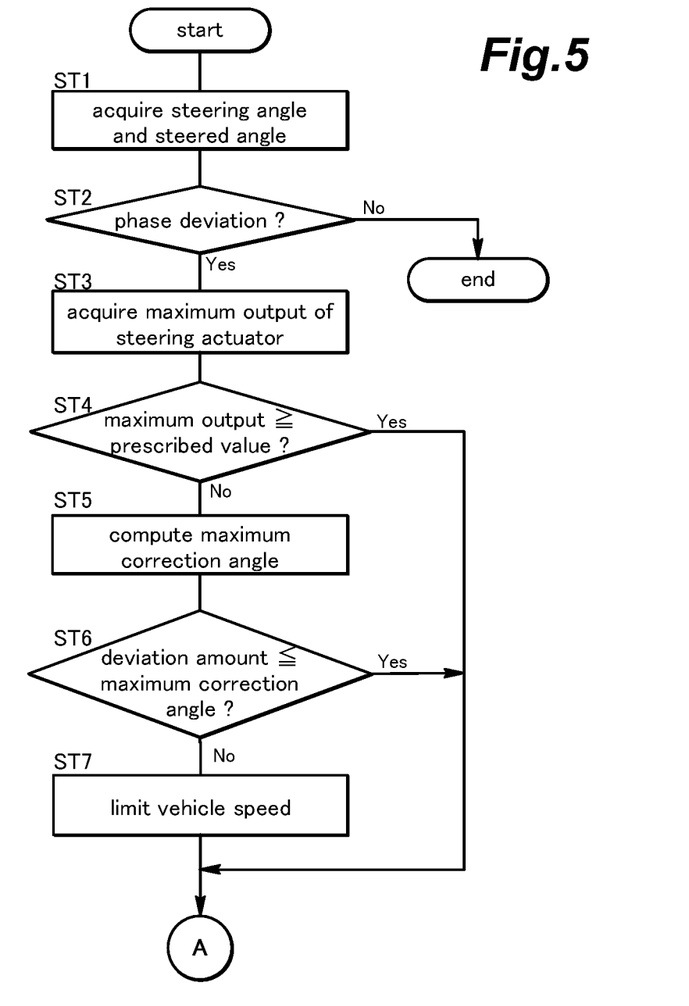
FIG. 5 is a flowchart of a first part of a phase matching control process executed by a control unit.
Figure 6:
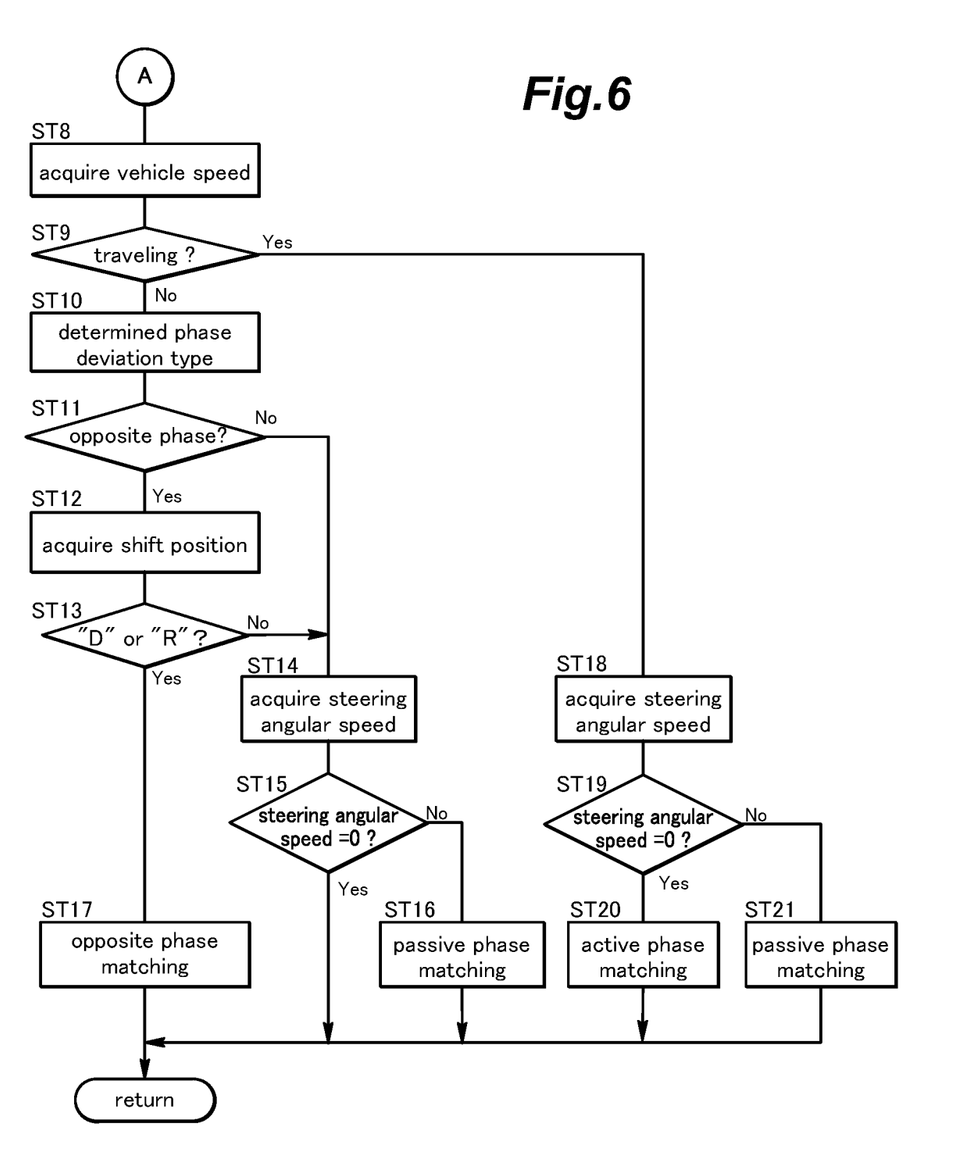
FIG. 6 is a flowchart of a second part of the phase matching control process executed by the control unit.

Since the phase relationship between the steering angle $\beta$ and the steered angle $\alpha$ may be disturbed while the ignition switch is off, the control unit 15 performs a phase matching control process as shown in FIGS. 5 and 6 when the ignition switch is turned on and the control unit 15 is activated.

FIG. 5 shows a flowchart of a first half of the phase matching control process executed by the control unit 15 at startup, and FIG. 6 shows a second half of the phase matching control process. As shown in FIG. 5, upon activation, the control unit 15 acquires the steering angle $\alpha$ and the steered angle $\alpha$ (step ST1), and determines if there is any deviation between the phases of the steering angle $\beta$ and the steered angle $\alpha$ (Step ST2). In step ST2, it is determined if the phase relationship between the steering angle $\beta$ and the steered angle $\alpha$ deviates from the predetermined gear ratio relationship (if the phase relationship deviates from the oblique gear ratio line K shown in FIG. 3). If the phases of the steering angle $\beta$ and the steered angle $\alpha$ coincide with each other (ST2: No), the control unit 15 concludes this process.

When the phases of the steering angle $\beta$ and the steered angle $\alpha$ deviate from each other (ST2: Yes), the control unit 15 acquires the maximum output of the steering actuator 12 (step ST3), and determines if the maximum output is equal to or greater than a predetermined value (step ST4). The predetermined value is selected as a value of the maximum output that allows the front wheels 3 to be steered at a predetermined speed while the vehicle 2 is stationary, and may be 90% or 80% of the rated maximum output, for example. The predetermined value may be either a fixed value or a variable value that changes depending on the state of the vehicle 2.

Figure 7:
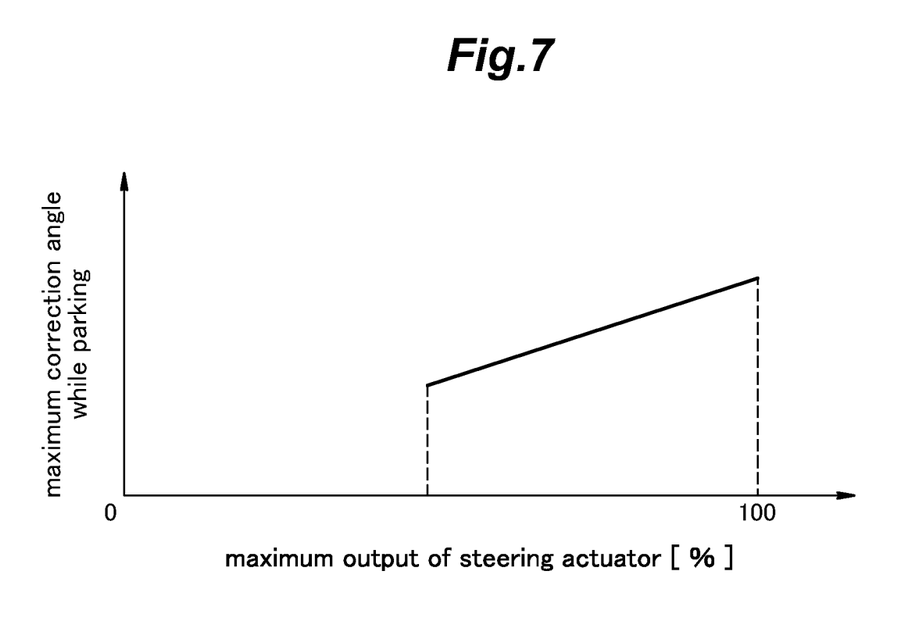
FIG. 7 is a graph showing the relationship between the maximum output of the steering actuator and a maximum correction angle.

When the maximum output of the steering actuator 12 is less than the predetermined value (ST4: No), the control unit 15 computes a maximum correction angle $\alpha_{cmax}$, or a maximum change in the steered angle $\alpha$ that can be achieved within a prescribed time period while the vehicle 2 is stationary based on the maximum output of the steering actuator 12 (step ST5). This prescribed time period is the longest after the ignition switch is turned on, gets shorter after the shift position SP is changed from the park position "P" to the drive position "D", and gets even shorter when the vehicle 2 starts traveling. The maximum correction angle $\alpha_{cmax}$ at a certain time point is set as given in the graph shown in FIG. 7, for example. Subsequently, in the control unit 15, it is determined if the deviation amount $α_{dev}$ given as the deviation of the steered angle α from the steering angle β in phase relationship, or the phase difference between the steered angle and the value obtained by multiplying the steering angle β by the gear ratio K is equal to or less than the above-mentioned maximum correction angle $α_{cmax}$ (step ST6).

When the deviation amount $α_{dev}$ of the steered angle α is larger than the maximum correction angle $α_{cmax}$ (ST6: No), the control unit 15 performs a speed limit operation by setting an upper limit to the vehicle speed V (step ST7), and the process flow advances to step ST8 in FIG. 6. For example, the control unit 15 sets the upper limit value of the vehicle speed V to 10 km/h. On the other hand, when the maximum output of the steering actuator 12 is equal to or greater than the predetermined value (ST4: Yes), and the deviation amount $α_{dev}$ of the steered angle α is equal to or less than the maximum correction angle $α_{cmax}$ (ST6: Yes), the control unit 15 proceeds to step ST8 shown in FIG. 6 without limiting the vehicle speed. As a result, the vehicle 2 is prevented from traveling at a vehicle speed V higher than the upper limit value until the determination result in step ST4 or in step ST6 becomes Yes. The vehicle speed limit is released also when the determination result in step ST2 becomes No, but normally the determination result in step ST6 becomes Yes before the determination result in step ST2 becomes No.

In this way, with the phases of the steering angle β and the steered angle α deviating from each other (ST2: Yes), if the maximum output of the steering actuator 12 is less than a predetermined value (ST4: No), and the deviation amount ad, of the steered angle α is larger than the maximum correction angle $α_{cmax}$ (ST6: No), the vehicle speed V is limited. The limit to the vehicle speed V is maintained until the maximum output of the steering actuator 12 is restored to the predetermined value or it is determined that the phases of the steered angle α and the steering angle β are matched before the vehicle speed V reaches the predetermined speed. Thereby, the vehicle 2 is prevented from traveling at high speed in a direction different from the direction intended by the driver.

As shown in FIG. 6, the control unit 15 acquires the vehicle speed V (step ST8), and determines if the vehicle 2 is traveling (Step ST9). More specifically, the control unit 15 determines that the vehicle 2 is traveling when the vehicle speed V is higher than a predetermined threshold value Vth, and otherwise determines that the vehicle 2 is stationary. When it is determined that the vehicle 2 is stationary (ST9: No), the control unit 15 determines the type of phase deviation according to the steering angle β and the steered angle α (step ST10) to determine if it is the case of the opposite phase relationship (type A) (step ST11).

In the case of the opposite phase relationship (ST11: Yes), the control unit 15 acquires the transmission shift position SP (step ST12), and determines if the transmission shift position SP is either the drive position "D" or the reverse position "R" (step ST13). If the driver has not yet operated the shift lever, and the transmission shift position SP is still in the park position "P" or the neural position "N" (ST13: No), or if the determination result of step ST11 is No, the control unit 15 acquires the steering angular velocity βdot (Step ST14). The control unit 15 determines if the steering angular velocity βdot is 0 (deg/sec) or is within a predetermined small velocity range that can be regarded as 0 (deg/sec) (step ST15). The latter case will be simply referred to as the case of "βdot=0" in the following disclosure for the convenience of description.

When the steering angular velocity βdot is 0 (ST15: Yes), the control unit 15 repeats the above process. When the steering member 10 is operated or steered by the driver and the steering angular velocity βdot is not 0 (ST15: No), the control unit 15 executes a passive phase matching (step ST16). In the passive phase matching in step ST16, at least one of the steering actuator 12 and the reaction force actuator 13 is driven so that the phases of the steering angle β and the steered angle α are brought closer to each other while the steering member 10 is being steered (ST15: No). Here, "bringing the phases of the steering angle β and the steered angle α closer to each other" means that the steering angle β and the steered angle α are brought closer to a prescribed relationship (the gear ratio relationship mentioned above). This phase matching is characterized as "passive" because the phase matching takes place only during a certain action such as a steering operation is being performed. In the present embodiment, the control unit 15 drives the steering actuator 12 in order to match the phases of the steering angle β and the steered angle α.

In the passive phase matching in step ST16, the control unit 15 causes the steering actuator 12 to bring the phases of the steering angle β and the steered angle α closer to each other using the event of operating the steering member 10 as a trigger (ST15: No). In this way, since the steered angle α is brough closer to the steering angle β in phase by using the operation of the steering member 10 as a trigger, the front wheels 3 is prevented from being steered without the driver anticipating it.

Figure 8:
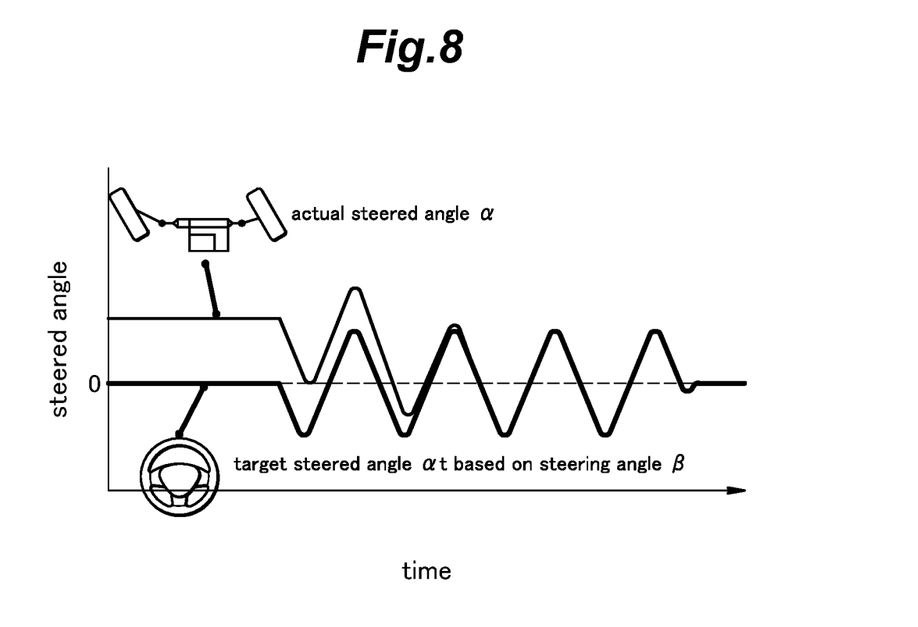
FIG. 8 is a time chart showing changes in the steered angle due to a passive phase matching process.

FIG. 8 is a time chart showing changes in the steered angle α in the passive phase matching. As shown in FIG. 8, in the passive phase matching, the control unit 15 drives the steering actuator 12 so as to gradually reduce the deviation $Δα$ ($=α_t−α$) between the target steered angle $α_t$ which is set according to the steering angle β and the actual steered angle α. Even when the steering member 10 is steered in a direction to come closer to the phase of the steered angle α, if the steering speed of the steering member 10 is equal to or higher than a predetermined steering speed, the control unit 15 drives the steering actuator 12 so that the front wheels 3 are steered in the same direction as the steering direction of the steering member 10.

Referring to FIG. 6 once again, in the passive phase matching in step ST16, the control unit 15 repeats the above process, or ceases driving the steering actuator 12 using the event of ceasing the operation of the steering member 10 as a trigger (ST15: Yes). As a result, the steered angle α is kept constant while the steering member 10 is not operated so that the driver is prevented from experiencing any discomfort.

When the driver performs a transmission shift operation to change the transmission shift position SP to the drive position "D" or the reverse position "R", the determination result in step ST13 becomes Yes, and the control unit 15 performs an opposite phase matching (step ST17). The opposite phase matching is a control process in which at least one of the steering actuator 12 and the reaction force actuator 13 is driven so that the phases of the steering angle β and the steered angle α are brought closer to each other, and into the same phase regardless if the steering member 10 is steered or not.

The opposite phase matching in step ST17 is triggered by the occurrence of the event that the transmission shift position SP is changed from the park position "P" or the neutral position "N" to the drive position "D" or the reverse position "R" in the determination process of step ST13. In other words, the control unit 15 starts the opposite phase matching on condition that the transmission shift position SP has been changed from the park position "P" or the neutral position "N" to a travel position. The opposite phase matching may be started immediately after this condition is met, possibly with a certain time delay.

In this way, triggered by the driver's action to change the transmission shift position SP from the park position "P" or the neutral position "R" to the travel position, the control unit 15 performs the opposite phase matching in step ST17, and brings the phases of the steered angle α and the steering angle β closer to each other. Therefore, only when the driver intends to start the vehicle, the phases of the steered angle α and the steering angle β are brought closer to each other.

In the present embodiment, the control unit 15 drives the steering actuator 12 in order to bring the steering angle β and the steered angle α into the same phase. In the opposite phase matching (ST17) of the present embodiment, the control unit 15 drives the steering actuator 12 with the target steered angle αt set at 0° (neutral position), and once the steered angle α coincides with the target steered angle αt, and once the phase of the steered angle α becomes the same as the phase of the steering angle β, ceases driving the steering actuator 12. Here, the target steered angle αt may be set to any value as long as it is within a certain range of 0° in the same phase relationship with steering angle β.

The steering actuator 12 ceases to be driven when the control unit 15 has determined that the direction of the steering angle β and the direction of the steered angle α coincide with each other (ST11: No). As a result, even when the steering member 10 is not operated (ST15: Yes), the steered angle α and/or the steering angle β are prevented from unnecessarily changing, and the vehicle 2 is prevented from traveling in a direction which the driver does not expect.

The opposite phase matching in step ST17 is performed regardless of whether the steering member 10 has been operated or not, unlike in the case of the passive phase matching in step ST16. Therefore, when the direction of the steering angle β and the direction of the steered angle α are opposite to each other (ST11: Yes), the phases of the steered angle α and the steering angle β can be brought closer to each other immediately after the transmission shift position SP is changed from the park position "P" or the neutral position "N" to the travel position regardless of the operation of the steering member 10.

When the control unit 15 executed the opposite phase matching in step ST17, the type of phase deviation is subsequently determined to be the opposite phase type in step ST11 (ST11: No). In this case, the control process executed by the control unit 15 advances the step ST14, and executes the passive phase matching (ST16) for matching the phases of the steering angle β and the steered angle α with each other while the steering member 10 is not steered (ST15: No).

Further, when the direction of the steering angle β and the direction of the steered angle α are opposite to each other (ST11: Yes), the passive phase matching in step ST16 is executed by using the operation of the steering member 10 (ST15: No) and the transmission shift position SP being at the park position "P" or the neutral position "N" (ST13: No) as a trigger. In this way, when the direction of the steering angle β and the direction of the steered angle α are opposite to each other, by using the operation of the steering member 10 as a trigger, the phases of the steered angle α and the steering angle β can be brought closer to each other without causing any discomfort to the driver.

If the vehicle 2 starts traveling without completing the phase matching of the steering angle β and the steered angle α by the passive phase matching in step ST16, it is determined in step ST9 that the vehicle 2 is traveling (ST9: Yes).

Thereafter, the control unit 15 acquires the steering angular velocity βdot (step ST18), and determines if the steering angular velocity βdot is 0 (step ST19) or not. When the steering angular velocity β dot is 0 (ST19: Yes), the control unit 15 executes an active phase matching (step ST20). The active phase matching is a control action by which at least one of the steering actuator 12 and the reaction force actuator 13 is driven so that the phases of the steering angle β and the steered angle α are gradually brought into agreement after the vehicle 2 has started traveling (ST9: Yes) even when the driver does not steer the steering member 10 (ST19: Yes). In the present embodiment, the control unit 15 drives the steering actuator 12 in order to match the phases of the steering angle β and the steered angle α.

In this way, regardless of whether the steering member 10 is operated or not, the control unit 15 executes the active phase matching in step ST20 so that the vehicle 2 is prevented from traveling at high speed in a direction which is not indented by the driver even when the steering member 10 is not operated. By executing the active phase matching, the phases of the steering angle β and the steered angle α are always brought into agreement after the vehicle 2 has started traveling. The phase matching control is concluded once the determination result in step ST2 becomes No. Thereby, the upper limit of the vehicle speed V is released.

Figure 9:
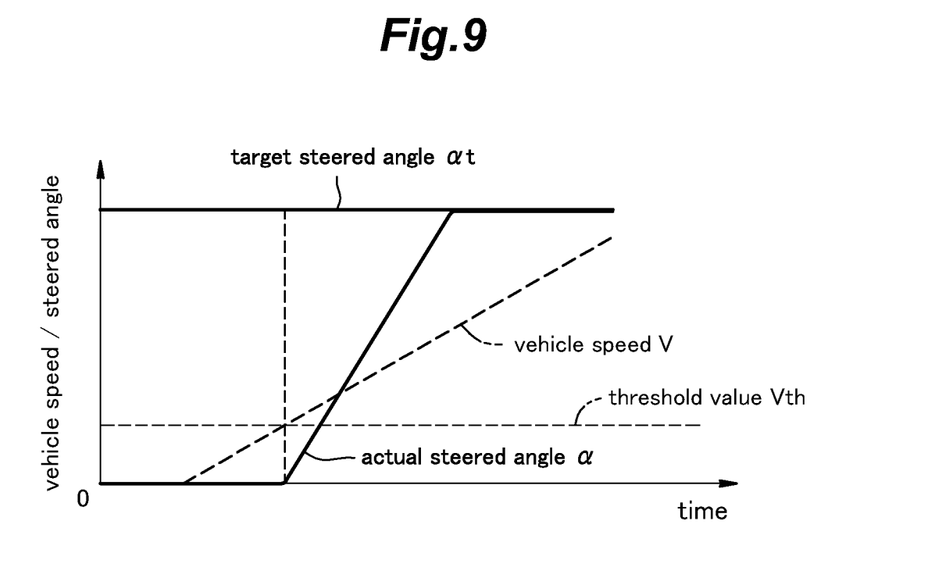
FIG. 9 is a time chart showing changes in the steered angle due to an active phase matching process.

FIG. 9 is a time chart showing changes in the steered angle α due to the active phase matching. As shown in FIG. 9, once the vehicle speed V becomes higher than a predetermined threshold value Vth, the control unit 15 initiates the active phase matching, and drives the steering actuator 12 so that the phase deviation between the steering angle β and the steered angle α is decreased.

At this time, in driving the steering actuator 12, the control unit 15 multiplies a deceleration gain G to the first current value A1 computed from to the deviation Δα between the target steered angle αt and the actual steered angle α in order to reduce the changing speed of the steered angle α as compared to the case of the normal steering angle control. As a result, the rate of change of the steered angle α becomes slower than in the normal state, and the vehicle 2 is prevented from behaving in a manner not anticipated by the driver.

The deceleration gain G may be selected so as to change with the vehicle speed V. More specifically, the deceleration gain G may be selected as a relatively large value when the vehicle speed V is low, and may be selected as a smaller value as the vehicle speed V increases so that the change speed of the steered angle α is made slower with an increase in the vehicle speed V. As a result, when the vehicle speed V is low, and the change in the steered angle α has a small effect on the vehicle behavior, the steered angle α is changed at a relatively high speed. Conversely, when the vehicle speed V is high, and the change in the steered angle α has a large effect on the vehicle behavior, the steering angle is changed at a relative low speed. Thereby, the vehicle 2 is prevented from behaving in an unexpected manner.

Referring to FIG. 6 once again, when the steering member 10 is steered by the driver while the vehicle 2 is traveling (ST9: Yes), and the steering angular velocity βdot is not 0 (ST19: No), the control unit 15 executes the passive phase matching (Step ST21). In the passive phase matching in step ST21, at least one of the steering actuator 12 and the reaction force actuator 13 is driven so that the phases of the steering angle β and the steered angle α are matched while the steering member 10 is not steered (ST19: No). In the present embodiment, the control unit 15 drives the steering actuator 12 in order to match the phases of the steering angle β and the steered angle α.

In the passive phase matching in step ST21, the control unit 15 drives the steering actuator 12 in such a manner that the change speed of the steered angle α is faster as compared to the case of the active phase matching (ST20) which is executed when the steering member 10 is operated. As a result, the steered angle α is caused to change at a high speed during the steering operation because the driver can easily predict the behavior of the vehicle 2 in such a situation, with the result that the phases of the steering angle β and the steered angle α can be matched at an early stage.

When the phases of the steering angle β and the steered angle α are matched by the passive phase matching in step ST16, the active phase matching in step ST20, or the passive phase matching in step ST21 and the determination result in step ST2 becomes No, the phase matching control is concluded.

Primary features and advantages of the steering system 1 according to the foregoing embodiment are discussed in the following.

As shown in FIG. 5, at the time of startup, if the steered angle α deviates from the predetermined relationship with respect to the steering angle β (ST2: Yes), and any of the trigger conditions of steps ST9, ST15 and ST17 shown in FIG. 6 is satisfied, the control unit 15 drives the steering actuator 12 to cause the steering angle β to come closer to the predetermined relationship with respect to the steered angle α (ST16, ST17, ST20, ST21), and sets the upper limit to the vehicle speed V (ST7). By limiting the vehicle speed V to the upper limit value in this manner, the vehicle 2 is prevented from suddenly accelerating in a direction not anticipated by the driver.

The control unit 15 acquires the maximum output of the steering actuator 12 at the time of activation or at the time of startup (ST3), and when the maximum output of the steering actuator 12 is equal to or higher than the predetermined value (ST4: Yes), does not set the upper limit value to the vehicle speed V. Therefore, the vehicle is not prevented from accelerating when vehicle is accelerated by the desire of the driver.

The control unit 15 computes the maximum correction angle $\alpha_{cmax}$, which is the maximum amount of change in the steered angle α that can be effected within a predetermined time period, based on the maximum output of the steering actuator 12 at the time of activation (ST5). Even if the maximum output of the steering actuator 12 is less than the predetermined value (ST4: No), as long as the deviation amount $\alpha_{dev}$ with respect to the predetermined relationship of the steered angle α is equal to or less than the maximum correction angle $\alpha_{cmax}$ (ST6: Yes), the control unit 15 does not set an upper limit value to the vehicle speed V. Therefore, the vehicle is not prevented from accelerating when vehicle is accelerated by the desire of the driver in a reliable manner.

When the maximum output of the steering actuator 12 is less than the predetermined value (ST4: No) and the deviation amount $\alpha_{dev}$, with respect to the predetermined relationship of the steered angle α is larger than the maximum correction angle $\alpha_{cmax}$ (ST6: No), the control unit 15 sets an upper limit value to the vehicle speed V until the maximum output becomes equal to or more than the predetermined value (ST4: Yes) or the deviation amount $\alpha_{dev}$ becomes equal to or less than the maximum correction angle $\alpha_{cmax}$ (ST6: Yes). Therefore, any sudden acceleration of the vehicle 2 is prevented until the direction anticipated by the driver and the traveling direction of the vehicle 2 can be brough to agree with each other within the predetermined time period, and the acceleration of the vehicle as desired by the driver becomes possible once it has become possible to make the direction anticipated by the driver and the traveling direction of the vehicle 2 agree with each other within the predetermined time period. Thus, both steering and acceleration can be performed as desired by the driver.

A steering device 1 according to a modification of the foregoing embodiment is described in the following with reference to FIG. 10. This modified embodiment differs from the foregoing embodiment in a part of the procedure for the phase matching control, but is otherwise similar to the foregoing embodiment. Therefore, only the part of the modified embodiment differing from the foregoing embodiment is described in the following.

Figure 10:
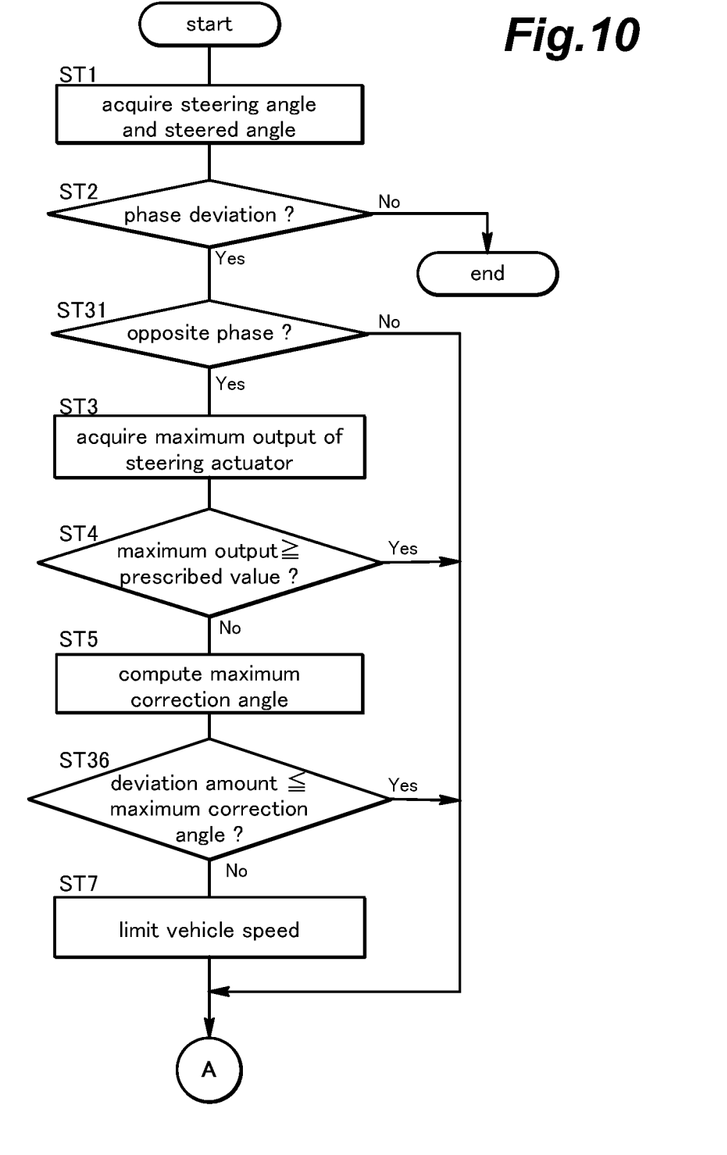
FIG. 10 is a first part of a flowchart of the phase matching control process according to a modified embodiment of the present invention.

FIG. 10 is a flowchart of the first half of the phase matching control according to the modified embodiment. The latter half of the phase matching control is the same as that of the foregoing embodiment shown in FIG. 6. As shown in FIG. 10, when it is determined in step ST2 that the phases of the steering angle β and the steered angle α are deviated from each other (Yes), the control unit 15 then determines if the phase deviation between the steering angle β and the steering angle α is the opposite phase type (step ST31). In the case of the opposite phase type deviation (ST31: Yes), the control flow advances to step ST3. In the case of the same phase type deviation (ST31: No), the control flow advances to step ST8 shown in FIG. 8. Thus, when the phase deviation is not the opposite phase type, the vehicle speed V is not limited in step ST6.

Steps ST3 to ST5 are the same as the corresponding steps in the foregoing embodiment. Following step ST5, the control unit 15 corrects the steered angle α to be in phase with the steering angle β, in other words, the control unit 15 computes the same-direction correction amount $\alpha_{devn}$ given as a correction amount required for placing the steered angle α on the same side as the steering angle β with respect to the neutral position, and determines if the same-direction correction amount $\alpha_{devn}$ is equal to or less than the maximum correction angle $\alpha_{cmax}$ (step ST36). The same-direction correction amount $\alpha_{devn}$ is a deviation angle of the steered angle α from the 0° position (neutral position).

When the same-direction correction amount $\alpha_{dev}$ is larger than the maximum correction angle $\alpha_{cmax}$ (ST36: No), the control unit 15 limits the vehicle speed by setting an upper limit value for the vehicle speed V (step ST7), and proceeds to in step ST8 shown in FIG. 6. On the other hand, when the determination result in step ST6 indicates that the same-direction correction amount $\alpha_{dev}$ is equal to or less than the maximum correction angle $\alpha_{cmax}$. (ST6: Yes), the control unit 15 proceeds to step ST8 shown in FIG. 6 without limiting the vehicle speed.

In this modified embodiment, even if the maximum output of the steering actuator 12 is less than the predetermined value (ST4: No), as long as the same direction correction amount $\alpha_{devn}$ that is required to place the steered angle α to be in the same direction as the steering angle β is equal to or less than the maximum correction angle $\alpha_{cmax}$ (ST36: Yes), the control unit 15 does not set an upper limit value for the vehicle speed V. Therefore, the vehicle is not prevented from accelerating when vehicle is accelerated by the desire of the driver in a reliable manner.

When the maximum output of the steering actuator 12 is less than the predetermined value (ST4: No), and the same-direction correction amount $\alpha_{dev}$ is larger than the maximum correction angle $\alpha_{cmax}$ (ST36: No), the control unit 15 sets the upper limit value to the vehicle speed V until the steered angle α comes to be in the same direction as the steering angle β (ST31: No), the maximum output becomes equal to or greater than the predetermined value (ST4: Yes), or the same direction correction amount $α_{devn}$ becomes equal to or less than the maximum correction angle $α_{cmax}$ (ST36: Yes). Therefore, any sudden acceleration of the vehicle 2 is prevented until the traveling direction anticipated by the driver and the actual traveling direction of the vehicle 2 can be made to be in the same direction within the predetermined time period, and once it has become possible to make the traveling direction anticipated by the driver and the actual traveling direction of the vehicle 2 to be in the same direction within the predetermined time period, it becomes possible for the driver to accelerate the vehicle 2 as the driver desires. Thereby, both steering operation and acceleration of the vehicle 2 can be performed as the driver desires.

The present invention has been described in terms of specific embodiments, but is not limited by such embodiments, and can be modified in various ways without departing from the scope of the present invention. In the foregoing embodiment, in step ST7, the control unit 15 sets an upper limit value to the vehicle speed V, but the control unit 15 may also set an upper limit value to the acceleration of the vehicle 2. This also prevents the vehicle 2 from moving at a high acceleration in a direction not anticipated by the driver. Further, the control unit 15 may drive the steering actuator 12 immediately (after step ST2 and before step ST8) at the time of activation. Also, the specific configuration, arrangement, quantity, angle, procedure, and the like of each member and part can be appropriately changed without deviating from the gist of the present invention. Further, all of the components shown in the above embodiments are not necessarily essential to the present invention, and can be appropriately selected and omitted without departing from the gist of the present invention.

[Reference Signs List]

| | |
|---|---|
| 1: steering system | 2: vehicle |
| 3: front wheel | 10: steering member |
| 11: steering mechanism | 12: steering actuator |
| 13: reaction force actuator | 15: control unit |
| 21: steering angle sensor | 32: steered angle sensor |
| α: steering angle | |
| $α_{dev}$: deviation | |
| $α_{devn}$: same-direction correction amount | |
| $α_{cmax}$: maximum correction angle | |
| β: steered angle | |
| V: vehicle speed | |

The invention claimed is:

1. A steering system for a vehicle, comprising:
a steering member configured to receive a steering operation;
a steering mechanism mechanically separated from the steering member and configured to steer wheels via a movement thereof;
a steering angle sensor that detects a steering angle of the steering member;
a steered angle sensor that detects a steered angle of the wheels;
a steering actuator configured to provide a drive force to the steering mechanism;
a reaction force actuator configured to apply a reaction force to the steering member in response to the steering operation; and
a control unit that controls an operation of the steering actuator to cause the steered angle to be in a prescribed relationship to the steering angle, and an operation of the reaction actuator to cause the reaction force to correspond to a steered state of the wheels,
wherein when the steered angle deviates from the prescribed relationship to the steering angle, immediately or upon satisfaction of a trigger condition, the control unit drives the steering actuator to bring the steered angle to come closer to the prescribed relationship to the steering angle, and sets an upper limit to a speed or an acceleration of the vehicle, and
wherein the control unit is configured to acquire a maximum output of the steering actuator, and when the maximum output of the steering actuator is equal to or greater than a prescribed value, does not set the upper limit to the speed or the acceleration of the vehicle.

2. The steering system for a vehicle according to claim 1, wherein the control unit computes a maximum correction angle which is given as a maximum change value of the steered angle that can be effected within a prescribed time period according to the maximum output of the steering actuator, and does not set the upper limit to the speed or the acceleration of the vehicle, even when the maximum output of the steering actuator is smaller than the prescribed value, as long as the steered angle deviates from the prescribed relationship to the steering angle by a deviation amount equal to or smaller than the maximum correction angle.

3. The steering system for a vehicle according to claim 2, wherein when the maximum output of the steering actuator is smaller than the prescribed value, and the deviation amount by which the steered angle deviates from the prescribed relationship is equal to or greater than the maximum correction angle, the control unit sets the upper limit to the speed or the acceleration of the vehicle until the maximum output becomes equal to or greater than the prescribed value, or until the deviation amount becomes equal to or smaller than the maximum correction angle.

4. The steering system for a vehicle according to claim 1, wherein the control unit computes a maximum correction angle which is given as a maximum change value of the steered angle that can be effected within a prescribed time period according to the maximum output of the steering actuator, and does not set the upper limit to the speed or the acceleration of the vehicle, even when the maximum output of the steering actuator is smaller than the prescribed value, as long as a same direction correction amount given as the correction amount that is required to make the steered angle to be on a same side of a neutral point as the steering angle is equal to or smaller than the maximum correction angle.

5. The steering system for a vehicle according to claim 4, wherein when the maximum output of the steering actuator is less than the prescribed value, and the same direction correction amount is greater than the maximum correction angle, the control unit sets the upper limit to the speed or the acceleration of the vehicle until the steered angle comes to be on a same side of the neutral point as the steering angle, until the maximum output becomes equal to or greater than the prescribed value, or until the same direction correction mount becomes equal to or smaller than the maximum correction angle.

* * * * *